(12) United States Patent
Wittler et al.

(10) Patent No.: US 11,310,203 B2
(45) Date of Patent: Apr. 19, 2022

(54) IOT COMPUTER SYSTEM AND ARRANGEMENT COMPRISING AN IOT COMPUTER SYSTEM AND AN EXTERNAL SYSTEM

(71) Applicant: Fujitsu Technology Solutions Intellectual Property GmbH, Munich (DE)

(72) Inventors: Nils Wittler, Munich (DE); Jürgen Atzkern, Munich (DE); Timo Bruderek, Munich (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 115 days.

(21) Appl. No.: 16/494,447

(22) PCT Filed: Oct. 16, 2018

(86) PCT No.: PCT/EP2018/078282
§ 371 (c)(1),
(2) Date: Sep. 16, 2019

(87) PCT Pub. No.: WO2019/091722
PCT Pub. Date: May 16, 2019

(65) Prior Publication Data
US 2020/0412695 A1    Dec. 31, 2020

(30) Foreign Application Priority Data

Nov. 7, 2017 (DE) ..................... 10 2017 125 990.2
Jan. 16, 2018 (DE) ..................... 10 2018 100 879.1

(51) Int. Cl.
*H04L 9/40*    (2022.01)
*H04L 29/06*    (2006.01)
(Continued)

(52) U.S. Cl.
CPC ...... *H04L 63/0263* (2013.01); *G06F 9/45558* (2013.01); *G16Y 10/75* (2020.01);
(Continued)

(58) Field of Classification Search
CPC . H04L 63/0263; H04L 63/0236; H04L 63/20; G16Y 30/10; G16Y 10/75; G06F 9/45558
See application file for complete search history.

(56) References Cited

U.S. PATENT DOCUMENTS 8,418,230 B1    4/2013    Cornelius et al.
9,485,231 B1   11/2016    Reese
(Continued)

FOREIGN PATENT DOCUMENTS

| EP | 3 208 991 A1 | 8/2017 |
| JP | 2016-506546 A | 3/2016 |
| JP | 2016-173741 A | 9/2016 |

OTHER PUBLICATIONS

Islam et al. (A Survey on Virtualization of Wireless Sensor Networks, Sensors 2012, 12, pp. 2175-2207) (Year: 2012).*
(Continued)

*Primary Examiner* — Oleg Korsak
(74) *Attorney, Agent, or Firm* — DLA Piper LLP (US)

(57) ABSTRACT

An IoT computer system, in particular a so-called edge computer system includes a first virtual operating environment and a second virtual operating environment. The virtual operating environments are logically separated from one another. An arrangement includes such an IoT computer system and at least one external system or device to which the IoT computer system is connected.

17 Claims, 1 Drawing Sheet

(51) Int. Cl.
G16Y 30/10 (2020.01)
G16Y 10/75 (2020.01)
G06F 9/455 (2018.01)

(52) U.S. Cl.
CPC .......... *G16Y 30/10* (2020.01); *H04L 63/0236* (2013.01); *H04L 63/20* (2013.01); *G06F 2009/45587* (2013.01); *G06F 2009/45595* (2013.01)

(56) References Cited

U.S. PATENT DOCUMENTS

| | | | |
|---|---|---|---|
| 11,025,627 B2* | 6/2021 | Li | H04L 67/14 |
| 2014/0006708 A1 | 1/2014 | Huynh et al. | |
| 2016/0328556 A1 | 11/2016 | Gardner | |
| 2017/0060574 A1 | 3/2017 | Malladi et al. | |
| 2017/0237763 A1* | 8/2017 | Candelore | H04W 12/088 726/25 |
| 2018/0024537 A1* | 1/2018 | Chauvet | G06F 9/50 718/104 |

OTHER PUBLICATIONS

Asaeda, H. et al., "Prototype implementation and evaluation methods in information-centric network technology", *Computer Software*, August issue in 2016, Japan, Japan Society for Software Science and Technology, Jul. 15, 2016, vol. 33, No. 3, pp. 3-15, including an English summary.

Terauchi, A. et al., "R&D efforts to create new value through IoT/Efforts for data exchange technology that provides real-time scalability of computational processing", *NTT Technical Journal* July issue in 2017, Japan, The Telecommunications Association (TTA); Jul. 1, 2017, vol. 29, No. 7, pp. 19-23 [see related NPL "AR" Sep. 2017 NTT Technical Review in English].

Terauchi, A. et al., "Data Exchange Technology Providing Real-time Data Processing and Scalability", *NTT Technical Review*, Sep. 2017, vol. 15, No. 9, 7 pages [corres. to NPL "AQ" Terauchi, A. et al. NTT Technical Journal, Jul. 1, 2017, 29(7), p. 19-23].

Notice of Reasons for Refusal dated Nov. 10, 2020, of counterpart Japanese Application No. 2019-552226, along with an English translation.

Michael Michael et al., "Mastering Virtual Machine Manager 2008 R2," 2010 Wiley Publishing, Inc.

Kevin Bachmann, BSc, "Design and Implementation of a Fog Computing Framework," Diploma Thesis, University of Technology in Vienna (Austria), Feb. 10, 2017.

WikipediA, "Operating-system-level virtualization," https://en.wilipedia.org/index.php?title=Operating-system-level_virtualization&oldid=804498162 (Oct. 8, 2018).

* cited by examiner

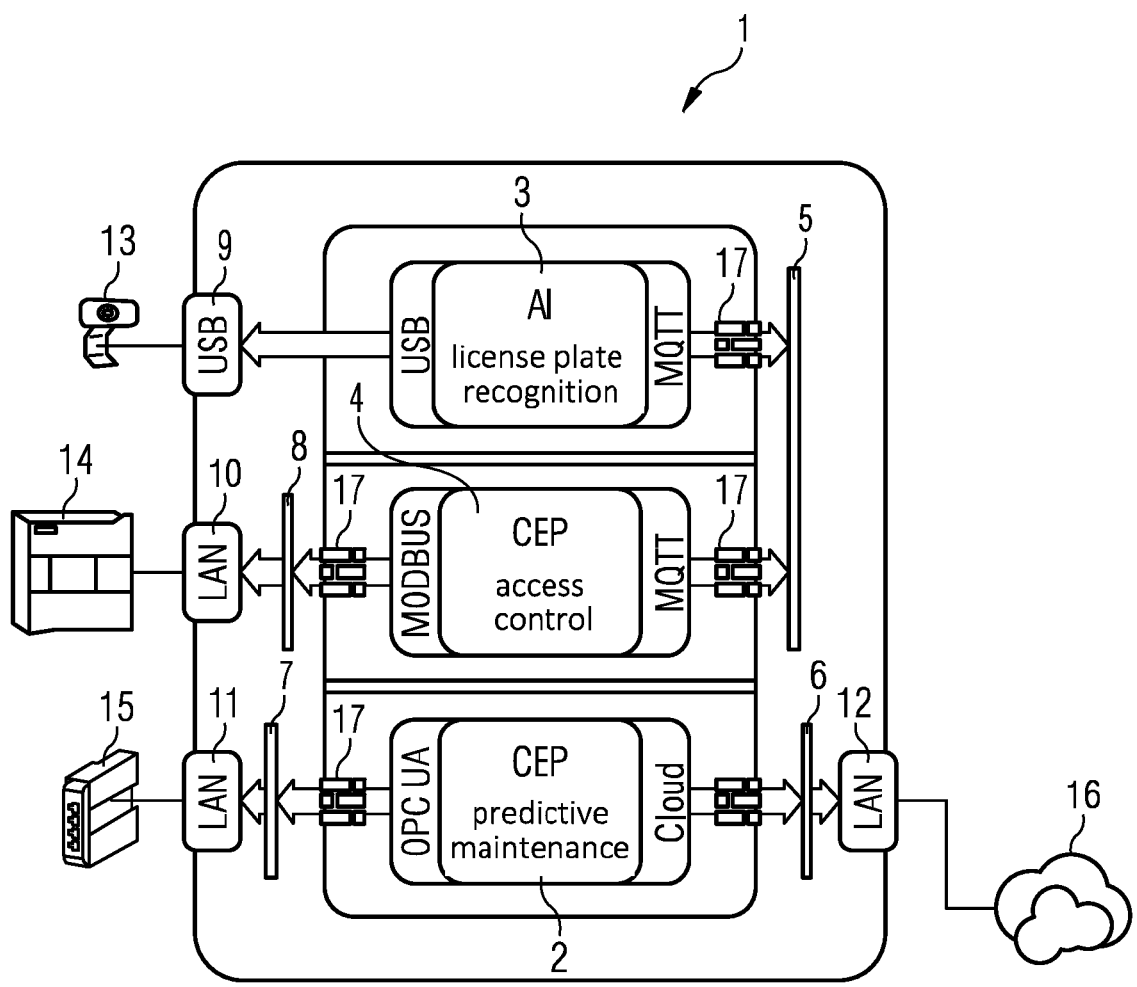

IOT COMPUTER SYSTEM AND ARRANGEMENT COMPRISING AN IOT COMPUTER SYSTEM AND AN EXTERNAL SYSTEM

TECHNICAL FIELD

This disclosure relates to an IoT computer system, in particular an edge computer system, and an arrangement with such an IoT computer system and an external system or device to which that IoT computer system is connected.

BACKGROUND

Computer systems are becoming increasingly important, especially in the realization of automation and processing tasks. With the growing interconnection and number of smart (end) devices and compact systems, e.g., sensors or processing and control devices that are connected to the Internet (so-called Internet of Things, IoT briefly), the amount of data that has to be transmitted, handled, processed by the individual systems and exchanged between the systems or between a client system and a host system is also growing. This requires increasing computing performance or "intelligence."

Besides data centers or cloud services (cloud servers) as such, edge computing is a promising approach to linking and connecting IoT devices or processing the data generated by them. The computing performance or "intelligence" of the remote data center or cloud service is brought into the immediate vicinity ("at the edge") of the IoT devices, i.e., at or near their place of use to collect, process and evaluate the data directly "on site." This means that a large amount of data can be processed directly on site. Data centers or cloud services are then only necessary for the storage and further processing of a possibly reduced fraction of the data or the correspondingly pre-processed information. Advantages are, for example, a reduction in data storage costs or performance costs incurred for the use of the infrastructure of a data center or a cloud service of a corresponding provider, as well as a reduction in the required bandwidth for the transmission of corresponding data.

To realize such an edge computing, a so-called IoT computer system or edge computer system is required. This is a computer system that has been set up and dimensioned (especially for this purpose). An important requirement is, e.g., continuous operation (so-called 24/7 operation) or reliable operation even at exposed and possibly extreme operating sites with challenging environmental conditions (e.g., very cold, wet, hot or dusty operating sites). Nevertheless, an edge computer system should ideally have a compact design and require only little construction or installation space. An attractive area of application for edge computing is, for example, the application in industrial plants (so-called "industry 4.0"), in which vast amounts of sensor data, system data, plant data, process data, control data and communication data (to name just a selection) are produced. Many different applications are conceivable.

A challenge in processing a wide variety of data and information in an edge computer system is that in the edge computer system various types of information and data may converge, which, however, are defined, permitted and intended for completely different user groups. Data security and confidentiality play a very important role here. If an edge computer system is used at a certain operating site, for example, 1) data of the computer system itself such as telemetry data, in particular machine data, control variables, measured values or parameters, are generated, but also 2) data related to the use of the edge computer system at its operating site such as sensor data, control data, plant data, personal data or communication data.

The data of type 1) are important, e.g., for the manufacturer or IT service provider of the edge computer system or the edge computer system solution. This data can be used, for example, for so-called predictive maintenance of the edge computer system to improve reliability or maintenance or to better compensate for an actual failure.

The data of type 2) are important, for example, for the operator of a plant using the edge computer system or the edge computer system solution. The data is generated during operation or used for it. Corresponding data of type 1) or type 2) can therefore be highly confidential for the respective authorized parties and should or must be protected against access by unauthorized user groups. Legal regulations or data protection requirements may also apply.

Conventional solutions using data centers or cloud services merely provide for the collection of all data at the operating site, transfer of this data to a single endpoint, e.g., in the data center or cloud, and further splitting of the data and redistribution, e.g., by so-called cloud-to-cloud connections. However, such solutions often only offer inadequate protection against unauthorized access to sensitive or trustworthy data. Data centers or cloud services are also an attractive target for cyber attacks because all data converges at the endpoints. In addition, such solutions have the disadvantages described above in connection with data centers or cloud services.

It could therefore be helpful to provide an IoT computer system that enables optimal data processing for IoT applications, with simultaneously improved data security of sensitive respectively trustworthy data for different user groups of the computer system.

SUMMARY

We provide an IoT computer system including a first virtual operating environment and a second virtual operating environment, wherein the virtual operating environments are logically separated from one another such that one virtual operating environment has no access to the other virtual operating environment.

We also provide an arrangement including the IoT computer system including a first virtual operating environment and a second virtual operating environment, wherein the virtual operating environments are logically separated from one another such that one virtual operating environment has no access to the other virtual operating environment, and an external system or device to which the IoT computer system connects, wherein the first virtual operating environment is logically associated with the external system or device.

BRIEF DESCRIPTION OF THE DRAWING

The drawing schematically shows an example of an IoT computer system.

LIST OF REFERENCE SIGNS

1 IoT computer system
2 First virtual operating environment
3 Second virtual operating environment
4 Third virtual operating environment
5 Virtual network connection
6 Virtual network connection 7 Virtual network connection
8 Virtual network connection
9 Physical network connection
10 Physical network connection
11 Physical network connection
12 Physical network connection
13 Web cam
14 Programmable logic controller
15 Management Server
16 Cloud Server
17 Firewall

DETAILED DESCRIPTION

The IoT computer system can also be described as edge computer system. The IoT computer system has a first virtual operating environment and a second virtual operating environment. The virtual operating environments are logically separated from one another. "Logical separation" means that one operating environment cannot address the other operating environment, let alone establish a (virtual) connection/network connection to it. The virtual operating environments can, for example, be set up as virtual machines. The virtual operating environments can be implemented such that they behave like a complete/independent computer system (virtual computer system).

With such an IoT computer system, one operating environment thus has no access to the other operating environment. This means that data generated or processed in one operating environment is logically separated from data generated or processed in the other operating environment. Virtualization and logical separation ("sandboxing") of the operating environments results in a separation of the data of the individual operating environments. Virtualization of the operating environments nevertheless allows a flexible setup and adaptation of the IoT computer system to the respective application purpose. Setting up logically separated virtualized operating environments thus allows the advantages of a conventional data center or cloud service to be combined with those of an edge computer to process data from connected IoT devices while still guaranteeing data security.

In this way, data and information of various types can be collected, processed and transported in an IoT deployment scenario by the IoT computer system in a high-performance yet secure manner and, above all, protected from unauthorized access. For example, one virtual operating environment may contain data intended for a first user group, e.g., the manufacturer or IT service provider of the IoT computer system, while the other virtual operating environment may contain data intended for a user group different from the first user group, e.g., the operator of an installation using the IoT computer system.

In various configurations of the IoT computer system, the virtual operating environments are each logically assigned to a communication network via at least one virtual network connection, in particular a virtual network bridge. The virtual network connections are advantageously configured such that a connection from the communication network, which is assigned to one of the two virtual operating environments, to the communication network, which is assigned to the other virtual operating environment, is prevented. In this way, a logical separation of the virtual operating environments can be easily realized. A logical separation of the virtual operating environments is set up by an appropriate configuration of the virtual network connections. Advantageously, it is not possible to establish a connection from the communication network assigned to one of the two virtual operating environments to the communication network assigned to the other virtual operating environment. Thus, even a user group that has access to one communication network (i.e., one virtual operating environment) cannot connect to the other communication network (i.e., the other virtual operating environment).

A virtual operating environment can easily be assigned to the corresponding communication network by configuring a virtual network connection, in particular a virtual network bridge, with a network connection (socket) of the virtual operating environment and a network connection (socket) of the corresponding communication network. In this way, a data connection from the virtual operating environment to the communication network and vice versa is possible. A corresponding configuration can be carried out, e.g., by software. For example, a (virtual) IP address or an IP address space of the communication network can be assigned to the virtual operating environment, whereby a network switching is programmed in the virtual network bridge. In short, the virtual operating environment is "mounted" into the associated communication network. The other communication network, in which the virtual operating environment is not "mounted," is logically separated from this virtual operating environment (and thus also the other virtual operating environment).

In various configurations of the IoT computer system, at least one of the virtual operating environments connects to at least one physical network interface by the at least one virtual network connection. The physical network interface is, e.g., a LAN interface or a USB interface. In this way, the virtual operating environment is connectable to physical network components of the IoT computer system. For example, the physical network interface is set up as I/O interface of the physical IoT computer system. In this example, the associated communication network also includes physical network components in addition to virtual components (in particular the virtual operating environment and the virtual network connection). The physical network interface is advantageously used to connect to one or more external devices in the IoT environment in which the IoT computer system is used.

In various configurations, several different physical network interfaces may be provided, the first virtual operating environment being connected to one or more first physical network interfaces and the second virtual operating environment being connected to one or more second physical network interfaces.

In various configurations, a basic operating system is set up on the IoT computer system. This can be, for example, a Linux system with a KVM infrastructure (so-called "Kernel-based Virtual Machine") for virtualization and control of the operating environments. Configuration of the virtual network connections is predefined by the basic operating system. The basic operating system serves as control component for the virtual network connections and is therefore a decisive component for the configuration of the logical separation of the virtual operating environments.

In various configurations of the IoT computer system, the configuration of the virtual network connections is fixedly predetermined by the basic operating system. The IoT computer system is advantageously set up such that a change in the configuration of the virtual network connections by the respective virtual operating environments or from a respective communication network is prevented. The configuration of the virtual network connections can therefore advantageously not be changed by the defined infrastructure from the virtual operating environments or communication networks. A specification of the configuration is only possible by the basic operating system. A configuration of the virtual network connections can be specified, for example, when setting up or installing the IoT computer system. For example, the configuration of the virtual network connections can be specified by the manufacturer.

Advantageously, configuration data for configuring the virtual network connections are stored in a protected area of the IoT computer system, where the area is secured against changing access by the virtual operating environments or from the associated communication networks. Such a protection can be achieved, e.g., by a write protection of the protected area. The (write) protection can be set up such that, e.g., by a superior user (superuser), the (write) protection cannot be disabled after setup by users or programs or applications that have access/authorizations with regard to the virtual operating environments or communication networks. The protected area can also be secured by further security measures such as encryption, signing, authentication via keys (credentials) and the like. The protected area can also be protected by other security measures such as encryption, signature, authentication via keys (credentials) and the like. It is possible that the protected area is set up in a specially (physically and/or logically) secured memory (area) within the IoT computer system. In this way, a logical separation of the virtual operating environments is fixedly predetermined and cannot be circumvented.

In various configurations of the IoT computer system, the basic operating system is set up such that a connection establishment from one of the communication networks, in particular from the respective virtual operating environments, into the basic operating system is prevented. This represents a further security measure against manipulation of the IoT computer system in an attempt to leverage the mechanisms described. Furthermore, this prevents any manipulation or interference within one virtual operating environment from continuing into another virtual operating environment.

In various configurations of the IoT computer system, the virtual operating environments each have one or more firewalls. These are set up to control a connection establishment from or a respective virtual operating environment from or into the logically assigned communication network. The firewalls can, for example, specify filter rules, in particular port and/or IP address filter rules that control a connection establishment accordingly. These filter rules can be specified by the virtual operating environments. In this way, access to or responsiveness of the virtual operating environments can be selectively controlled. The virtual operating environments are thus protected against unwanted or even malicious access. Optionally, the firewalls of the virtual operating environments can be controlled via the basic operating system.

In various configurations of the IoT computer system, one or more virtual (software) applications are set up within each virtual operating environment to provide predetermined functionalities. The applications can, for example, be function-specifically adapted to one or more tasks or functionalities of external devices. For example, functionalities such as capturing, handling, processing, assigning, comparing, extracting, converting, exporting, importing or the like of data can be provided by the applications. For this purpose, the individual virtual operating environments can have special tasks/applications of artificial intelligence (AI) or of complex data processing such as so-called CEP applications (complex event processing).

In various configurations of the IoT computer system, at least a third virtual operating environment is set up in addition to the first and second virtual operating environments. The third virtual operating environment is logically linked to one of the two virtual operating environments. For example, the third virtual operating environment is logically linked to the second virtual operating environment, while it is logically separated from the first virtual operating environment. The third virtual operating environment can advantageously extend or supplement the functionality provided by the second virtual operating environment. For example, it is possible that various processing levels or stages for data processing are provided by the second and third virtual operating environments, where the data is exchanged between the second and third virtual operating environments. However, this data remains logically separated from data within the first virtual operating environment.

The third virtual operating environment is advantageously logically linked via at least one virtual network connection, in particular a virtual network bridge, to the corresponding of the two virtual operating environments (e.g., to the second operating environment, see above). For the connection of the third virtual operating environment via the virtual network connection, the above explained to the virtual network connections of the first and second operating environment applies analogously. Through a virtual network connection between the third operating environment and the logically linked further operating environment (e.g., the second operating environment, see above), a (partially) virtual communication network is established between these two virtual operating environments so that the virtual operating environments can communicate with each other and, if necessary, also externally, e.g., with external devices.

In various configurations of the IoT computer system, the first virtual operating environment is set up as a manufacturer environment to capture, process or query (internal) system data from the IoT computer system or from external systems or devices, in particular machine data, control variables, measured values or parameters. Through the first virtual operating environment, telemetry data of the IoT computer system itself or of external systems or devices connected to the IoT computer system are captured and processed. The first virtual operating environment may contain components, in particular acquisition, processing or querying components such as sensors, applications, management controllers, kernels, buses and the like, or draw from physical resources of the IoT computer system. By the first virtual operating environment, a manufacturer can thus easily collect and evaluate data from the IoT computer system or from external systems or devices, e.g., for predictive maintenance. The first virtual operating environment can connect to an external physical maintenance network via a physical network interface. For example, this can be an OPC UA network (OPC UA stands for "Open Platform Communications Unified Architecture").

In various configurations of the IoT computer system, the second virtual operating environment is set up as an operator environment to record or process or control (external) operating data from or for external systems or devices, in particular sensor data, control data, plant data, person-related data, in particular biometric data, or communication data from or for the external systems or devices. By the second virtual operating environment, data from and to external devices, plants or systems are processed with which the IoT computer system is connected on site. The second virtual operating environment may contain components, in particular acquisition, processing or querying components such as sensors, applications, management controllers, kernels, buses and the like, or draw from physical resources of the IoT computer system. By the second virtual operating environment, an operator of the IoT computer system can thus control the external components or devices of his plant or system connected to it. For this purpose, the second virtual operating environment can be connected to one or more external physical control networks via a physical network interface. These can include a LAN network, USB network or a special control bus network such as MODBUS.

The IoT computer system is advantageously used within an arrangement. The arrangement comprises the IoT computer system of the type described and at least one external system or device to which the IoT computer system connects. The first virtual operating environment is logically linked to the external system or device. The second virtual operating environment can be logically separated from the external system or device. Alternatively, the second virtual operating environment can also be logically linked to the external system or device. It is advantageous to implement this logical link such that no manipulative impairment of a logical separation of the first and second virtual operating environments is possible or at least greatly impeded. In this way, the functionality of the IoT computer system is retained. For example, it can be specified that no data to be protected or confidential is transferred from the first and second virtual operating environments to the external system or device, but only control data. Alternatively or additionally, respective connections between the external system or device and the respective first and second virtual operating environment can be specially secured. Security measures such as encryption, signing, protocol changes, firewalls and the like can be considered to prevent access to confidential data within one of the virtual operating environments by the other virtual operating environment or make it very difficult and ensure logical separation of the two operating environments.

The external system or device can be, for example, a sensor, a control device (e.g., a programmable logic controller, PLC) or a processing, management or data server, in particular a cloud server, or a combination of such systems or devices.

The arrangement can be advantageously further developed such that the IoT computer system connects to at least one further external system or device, whereby the second virtual operating environment is logically linked to the further external system or device. The first virtual operating environment can be logically separated from the further external system or device. Alternatively, the first virtual operating environment can also be logically linked to the further external system or device. This logical link is to be implemented advantageously such that no manipulative impairment of a logical separation of the first and second virtual operating environments is possible or at least greatly impeded. In this way, the functionality of the IoT computer system described here is retained. For this purpose, the measures described above can be applied analogously.

The further external system or device can also be a sensor, a control device (e.g., a programmable logic controller, PLC) or a processing, management or data server, in particular a cloud server, or a combination of such systems or devices.

Our systems and arrangements will be explained in more detail in the following based on examples with the aid of a drawing.

The FIGURE shows an IoT computer system 1. The IoT computer system 1 has a first virtual operating environment 2, a second virtual operating environment 3, and a third virtual operating environment 4. The virtual operating environments 2, 3, 4 are, for example, organized/set up as virtual machines within the IoT computer system 1. The virtual operating environments 2, 3, 4 can be implemented such that they each behave like a complete/independent computer system (virtual computer system). The virtual operating environments 2, 3, 4 each provide application-specific functionalities for operation of the IoT computer system 1. The IoT computer system 1 connects to various external devices or systems. As examples, a webcam 13, a programmable logic controller (PLC) 14, a management or maintenance server 15 and a cloud server or cloud service 16 are shown. The external devices 13, 14, 15 and 16 can communicate with the IoT computer system 1 and exchange data with it.

The first virtual operating environment 2 is set up as a manufacturer environment for capturing, processing or querying internal system data of the IoT computer system 1, in particular machine data, control variables, measured values or parameters of the IoT computer system 1. By the first virtual operating environment 2 telemetry data of the IoT computer system 1 itself are captured and processed. The first virtual operating environment 2 has virtual components for this purpose, in particular acquisition, processing or query components such as sensors, applications, management controllers, kernels, buses and the like, or uses these from physical resources of the IoT computer system 1. Using the first virtual operating environment 2, a manufacturer can easily collect and evaluate data from the IoT computer system 1, e.g., for predictive maintenance. The first virtual operating environment 2 connects to one or more external physical maintenance or management networks via virtual network connections, e.g., virtual network bridges, 6 and 7 and also via physical network interfaces 11 and 12 that in turn connect to them. The physical network interfaces 11 and 12 are, e.g., LAN interfaces of the IoT computer system 1. Between the first virtual operating environment 2 and the virtual network connections 6, 7, a firewall 17 is each interposed, which is controlled by the first virtual operating environment 2 and secures this against unauthorized connections from and/or into the external physical maintenance and/or management networks.

The first virtual operating environment 2 connects to the management or maintenance server 15 via the network interface 11. This connection can, for example, be an OPC UA network. The management or maintenance server 15 is, for example, an OPC UA server. The first virtual operating environment 2 connects to the cloud server or cloud service 16 via the network interface 11. In this way, the first virtual operating environment 2 and the devices 15 and 16 form a communication network (manufacturer network).

The second virtual operating environment 3 and the third virtual operating environment 4 are set up as a common operator environment to acquire or process or control external operating data from or for the other external systems or devices 13 and 14, in particular sensor data, control data, plant data, personal data or communication data from or for the external systems or devices 13, 14. Through the second and third virtual operating environments 3, 4, data from and to the external devices 13, 14 are thus processed. The second and third virtual operating environments 3, 4 contain virtual components for this purpose, in particular acquisition, processing or query components such as sensors, applications, management controllers, kernels, buses and the like, or use these from physical resources of the IoT computer system 1. Using the second and third virtual operating environments 3, 4, an operator of the IoT computer system 1 can thus control the external devices 13, 14 of his plant or system connected to it.

The second virtual operating environment 3 logically connects to the third virtual operating environment 4 via one or more virtual network connections, e.g., virtual network bridges, 5. This means that the second and third operating environments 3, 4 can communicate with each other and exchange data. Furthermore, the second operating environment 3 connects to device 13 via one or more virtual network connections (not explicitly shown in the FIGURE) and via a physical network interface 9 connects in turn to these. The third virtual operating environment 4 connects to device 14 via one or more virtual network connections, e.g., virtual network bridges, 8 and via a physical network interface 10 connected in turn to these. A firewall 17 connects between the second virtual operating environment 3 and the virtual network connection 5 which is controlled by the second virtual operating environment 3 and secures it against unauthorized connections from or into the virtual network connection 5. Firewalls 17 each connect between the third virtual operating environment 4 and the virtual network connections 5 and 8, which is controlled by the third virtual operating environment 4 and secures it against unauthorized connections from or into the virtual network connection 5 or into the external network towards the device 14.

The physical network interface 9 is, e.g., a USB interface, while the physical network interface 10 is, e.g., a LAN interface of the IoT computer system 1. In this way, the second and third operating environments 3, 4 are linked to each other as well as to one or more external physical control or data networks (to and from devices 13 and 14) via physical network interfaces. These include a LAN network, USB network or a special control bus network, e.g., between device 14 and the IoT computer system 1. The control bus network can include a MODBUS network, for example. In this way, the second and third virtual operating environments 3, 4 and the devices 13 and 14 form a communication network (operator network).

A higher-level control or configuration of the individual virtual operating environments 2, 3, 4 or the virtual network connections 5, 6, 7, 8 between the virtual operating environments 2, 3, 4 or the external devices 13, 14, 15, 16 is carried out via a basic operating system (not explicitly shown) of the IoT computer system 1. The basic operating system can, for example, be a Linux system with an integrated KVM system. In particular, the basic operating system specifies a defined configuration of the virtual network connections 5, 6, 7, 8. This configuration is so fixedly pre-determined that it cannot be changed by the individual virtual operating environments 2, 3, 4 or by the external devices 13, 14, 15, 16 or generally from the corresponding networks. For example, the configuration of the virtual network connections 5, 6, 7, 8 is specified when setting up or installing the IoT computer system 1. For example, the configuration of the virtual network connections 5, 6, 7, 8 can be specified by the manufacturer.

Configuration data for the configuration of the virtual network connections 5, 6, 7, 8 are advantageously stored in a protected area of the IoT computer system 1, whereby the area is protected against changing access by the virtual operating environments 2, 3, 4 or from the associated communication networks from and to the external devices 13, 14, 15, 16. Such protection can, for example, be achieved by write-protecting the protected area. The (write) protection may be set up such that, e.g., by a superuser, the (write) protection after setup cannot be disabled by users or programs or applications that have access/authorizations regarding the virtual operating environments 2, 3, 4 or regarding the communication networks to and from the external devices 13, 14, 15, 16. The protected area may also be protected by other security measures such as encryption, signing, authentication via keys (credentials) and the like. The protected area may also be protected by other security measures. It is possible that the protected area is set up in a specially (physically and/or logically) secured memory (area) within the IoT computer system 1.

The configuration of the virtual network connections 5, 6, 7, 8 is predefined so that there is no logical connection between the first virtual operating environment 2 and one of the second or third virtual operating environments 3, 4. This means that the first virtual environment 2 is logically separated from the second and third virtual environments 3, 4. It is not possible to establish a connection in both directions between the first virtual operating environment 2 and one of the second or third virtual operating environments 3, 4. This is achieved by not establishing a logical network connection (socket) within the virtual network connections 5, 6, 7, 8 that allows a connection between the first virtual operating environment 2 and one of the second or third virtual operating environments 3, 4. This in turn means that a connection cannot be established from one of the external devices 13 and 14 to the first virtual operating environment 2, or a connection can also not be established from one of the external devices 15 and 16 to one of the second or third virtual operating environments 3, 4.

In this way, a manufacturer environment implemented by the first virtual operating environment 2 is logically separated from an operator environment jointly implemented by the second and third virtual operating environments 3, 4. Thus, confidential or sensitive data within the manufacturer environment is logically separated and isolated from data within the operator environment. An authorized user, device, system or software program within the manufacturer environment has no access to data within the operator environment and vice versa. Such access is prevented due to a lack of a defined or deliberately prevented network connection. The manufacturer environment can only communicate with devices 15, 16 via network connections 6, 7, 11, 12. The operator environment can only communicate with the devices 13, 14 via the network connections 5, 8, 9, 10.

A possible application scenario of the arrangement shown with the IoT computer system 1 and the external devices 13, 14, 15, 16 is, for example, a parking lot system with a barrier system. The webcam 13 captures license plates of motor vehicles entering or leaving the parking lot system. The image data of the webcam 13 is sent via the network connection 9 to the second virtual operating environment 3 within the physical IoT computer system 1. Within the second virtual operating environment 3, one or more virtual applications of an artificial intelligence (AI) are used to process the image data of the webcam 13. This can include, for example, extracting letters and numbers from the image data of the webcam 13 and providing the letters and numbers as a character string. This string is passed through the network connection 5 of the third virtual operating environment 4 within the physical IoT computer system 1. Within the third virtual operating environment 4, one or more virtual applications of complex data processing (CEP) are used to compare the character string with stored comparison patterns. Personal data, e.g., owner data of the vehicle, or clock times, time stamps, credit card data of the owner of the vehicle and the like can also be evaluated. This data can, for example, be stored in a database within the virtual operating environment 4. In this way, it can be determined whether a vehicle with the registered number plate has permitted access to the parking lot system or a permitted exit from the parking lot system (e.g., after a valid payment transaction or the like).

If this is confirmed within the virtual operating environment 4, the virtual operating environment 4 sends a corresponding control signal to the PLC 14 via the network connections 8, 10, which in turn controls the barrier system so that a barrier is opened. The registered motor vehicle can then drive in or out.

Independently and logically separated from the second and third operating environments 3, 4 (operator environment of the parking lot system), a manufacturer, e.g., of the barrier system or only of the IoT computer system 1, which is used in the parking lot system of the operator, can acquire and evaluate within the manufacturer environment 2 telemetry data of the barrier system or of the IoT computer system 1 (e.g., system parameters of the IoT computer system 1) using the management server 15 or record and evaluate them using the cloud service or cloud server 16. However, at least within the IoT computer system 1, the manufacturer cannot establish a connection to components of the virtual operating environments 3, 4. This means that the manufacturer does not have access to data, e.g., image data from the webcam 13 or personal data, e.g., from owners of the identified vehicles, within the virtual operating environments 3, 4. Conversely, the operator does not have access to data, e.g., internal device data, implementations and the like of either the IoT computer system 1 as such or the devices 15, 16 and possibly 14 which are in the hands of the manufacturer.

It is possible that external devices, e.g., devices 14 and 15, can exchange data via external networks outside the IoT computer system 1. For example, the PLC 14 can make control data (e.g., number of opening and closing operations, error situations or error codes and the like) of the barrier system available to the management server 15. This control data can then be entered by the management server 15 into the virtual operating environment 2 within the IoT computer system 1 and evaluated there for predictive maintenance and checking of the operating behavior of the barrier system. It is advantageous to secure or implement an external connection between devices 14 and 15 such that there is no unwanted bypass or manipulation possibility between the logically separated virtual operating environments 3, 4 and virtual operating environment 2. This can be achieved, for example, by not issuing operator information to be protected from virtual operating environments 3, 4 to device 14, but only control data. Conversely, this can be achieved, e.g., by not issuing any manufacturer information to be protected from virtual operating environment 2 to device 15, but only control data. Corresponding connections can be specially protected against manipulation, e.g., via the respective firewalls 17.

The examples shown and the application scenario explained are only exemplary. There are many possible implementations and applications. Especially in the industrial plant environment, e.g., in wind power or solar plants or in the industrial production and manufacture of products, there are numerous application examples.

In implementations that are not shown, the virtual operating environments 3 and 4 can also be logically separated from each other to prevent data misuse between these operating environments.

The invention claimed is:
1. An Internet of Things (IoT) computer system comprising a first virtual operating environment and a second virtual operating environment, wherein the first and second virtual operating environments are implemented to each behave like an independent virtual computer system and are logically separated from one another such that one virtual operating environment has no access to the other virtual operating environment,
 wherein each of the first and second virtual operating environments are logically associated with an external system or device connected to the IoT computer system,
 wherein the first virtual operating environment is set up as a manufacturer environment to acquire telemetry data of the IoT computer system and to communicate the telemetry data to the external system or device logically associated with the first virtual operating environment, and
 wherein the second virtual operating environment is set up as an operator environment to record, process or control operating data from or for the external system or device logically associated with the second virtual operating environment.

2. The IoT computer system according to claim 1, wherein the virtual operating environments are each logically assigned to a communication network via at least one virtual network connection or a virtual network bridge, wherein the virtual network connections are configured such that a connection from the communication network associated with one of the two virtual operating environments to the communication network associated with the other virtual operating environment is prevented.

3. The IoT computer system according to claim 2, wherein at least one of the virtual operating environments connects to at least one physical network interface by the at least one virtual network connection.

4. The IoT computer system according to claim 3, wherein the physical network interface is a Local Area Network (LAN) interface or a Universal Serial Bus (USB) interface.

5. The IoT computer system according to claim 2, on which a basic operating system is set up, and a configuration of the virtual network connections is predetermined by the basic operating system.

6. The IoT computer system according to claim 5, wherein configuration of the virtual network connections is fixedly predetermined by the basic operating system and the IoT computer system is set up such that a change in the configuration of the virtual network connections by the respective virtual operating environments or through a respective communication network is prevented.

7. The IoT computer system according to claim 6, wherein configuration data for the configuration of the virtual network connections are stored in a protected or write-protected area of the IoT computer system.

8. The IoT computer system according to claim 5, wherein the basic operating system is set up such that a connection establishment from one of the communication networks or the respective virtual operating environments into the basic operating system is prevented.

9. The IoT computer system according to claim 2, wherein the virtual operating environments each comprise one or more firewalls set up to control a connection establishment from or to a respective virtual operating environment from or into the logically associated communication network.

10. The IoT computer system according to claim 1, wherein the virtual operating environments are set up as virtual machines.

11. The IoT computer system according to claim 1, wherein one or more virtual applications are each set up within the virtual operating environments for provision of predetermined functionalities.

12. The IoT computer system according to claim 1, further comprising at least one third virtual operating environment which is logically linked to one of the first and second virtual operating environments.

13. The IoT computer system according to claim 12, wherein the third virtual operating environment is logically linked via at least one virtual network connection or a virtual network bridge to the corresponding one of two virtual operating environments.

14. An arrangement comprising:
an Internet of Things (IoT) computer system comprising a first virtual operating environment and a second virtual operating environment, wherein the first and second virtual operating environments are implemented to each behave like an independent virtual computer system and are logically separated from one another such that one virtual operating environment has no access to the other virtual operating environment,
wherein each of the first and second virtual operating environment is logically associated with an external system or device connected to the IoT computer system,
wherein the first virtual operating environment is set up as a manufacturer environment to interrogate telemetry data of the IoT computer system and to communicate the telemetry data to the external system or device logically linked to the first virtual operating environment, and
wherein the second virtual operating environment is set up as an operator environment to record, process or control operating data from or for the external system or device logically linked to the second virtual operating environment, and
external systems or devices to which the IoT computer system connects, wherein the first and second virtual operating environments are logically linked to respective ones of the external systems or devices.

15. The arrangement according to claim 14, wherein the external system or device is a sensor, a control device or a processing or data server or a cloud server.

16. The arrangement according to claim 14, wherein the IoT computer system connects to a further external system or device, and
the second virtual operating environment is logically associated with the further external system or device.

17. The arrangement according to claim 15, wherein the IoT computer system connects to a further external system or device, and
the second virtual operating environment is logically associated with the further external system or device.

\* \* \* \* \*